April 23, 1940.    H. F. MARANVILLE    2,198,270
TRAILER
Filed Feb. 2, 1937    2 Sheets-Sheet 1

INVENTOR
*Harvey F. Maranville*
BY
*Evans & McCoy*
ATTORNEYS

April 23, 1940. H. F. MARANVILLE 2,198,270
TRAILER
Filed Feb. 2, 1937 2 Sheets-Sheet 2

INVENTOR
Harvey F. Maranville
BY
Evans & McCoy
ATTORNEYS

Patented Apr. 23, 1940

2,198,270

UNITED STATES PATENT OFFICE 2,198,270

TRAILER

Harvey F. Maranville, Akron, Ohio, assignor to The General Tire & Rubber Company, Akron, Ohio, a corporation of Ohio Application February 2, 1937, Serial No. 123,635

4 Claims. (Cl. 280—33.4)

This invention relates to an improved trailer construction, and more particularly to a trailer of the caster wheel type.

It is an object of the present invention to provide a trailer construction in which the bed or frame structure of the trailer may be directly connected to the towing vehicle.

Another object is to provide a caster wheel trailer design which has a minimum of unsprung weight and which is adapted to the use of a single caster wheel or a plurality of caster wheels.

A further object is to provide a caster wheel trailer which is smooth, easy, and level riding and yet simple in design and construction and inexpensive to manufacture.

Other objects and advantages will become apparent as the description of the invention proceeds. This description is made in connection with the accompanying drawings, in which Figure 1 illustrates a side elevation of a trailer embodying the present invention connected to a towing vehicle;

Figure 1:
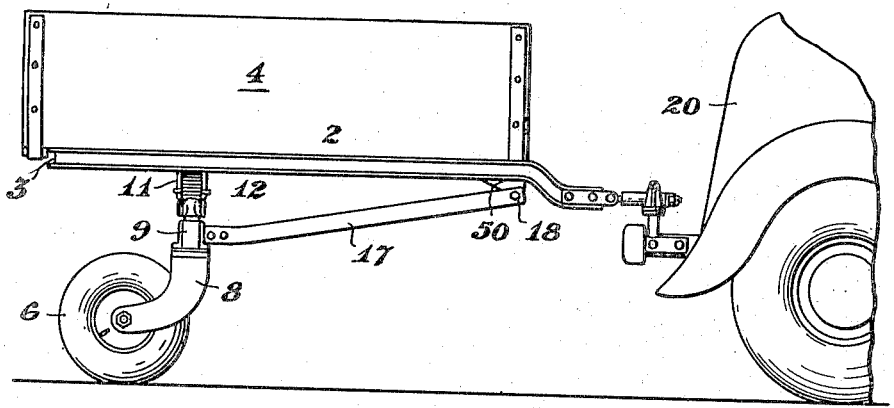

Referring to the drawings by numerals of reference which indicate like parts throughout the several views, the trailer comprises a pair of frame members 1 and 2, which are positioned substantially horizontally and parallel with one another. Each is connected at its forward end to the rear of a towing vehicle in a manner to be hereinafter described. The rearward extremities of the frame members 1 and 2 are joined by a rear frame member 3. If desired the frame members 1 and 2 and rear frame member 3 may be formed integrally of a single length of U-shaped channel iron, as shown. This is accomplished by bending the ends of the channel at right angles to a central portion thereof, which thus forms the rear frame member with the ends disposed in parallel relation to form the frame members 1 and 2.

Carried on the frame members is a trailer body indicated generally by the numeral 4. This trailer body may be of any suitable well known form and is secured to the trailer frame in any conventional manner, such as by nuts and bolts or by welding.

The trailer is supported by wheels 5 and 6. These wheels are preferably equipped with pneumatic rubber tires to improve the easy riding qualities of the trailer. Each wheel is journaled on an axle 7 carried by a fork or yoke 8 journaled in a journal or supporting member 9, in a manner to be hereinafter described.

The journal members 9 are connected by a transverse supporting member 10 which retains the journals in spaced relation and aids in maintaining the wheels in proper position. The body 4 and frame of the trailer are resiliently mounted on the wheels 5 and 6 by means of a transverse semielliptic spring 11. The central portion of the spring is engaged between spring bearing plates 13 by a pair of U-bolts 12 which secure the spring to the central portion of a transverse framing member 14. The framing member 14 extends between the frame members 1 and 2 previously mentioned and may be secured thereto in any suitable manner, such as by welding. Thus the spring permits resilient vertical movement of the body and frame of the trailer.

The ends of the spring 11 are carried by shackles 15 which are slung from upstanding brackets 16 secured in the journal members 9, thus supporting the spring directly on the wheel journals.

A radius rod or stabilizing bar 17 is also secured to each of the journal members 9 and extends forwardly under the body of the trailer and is secured thereto at some forward position by the pivot 18. This radius rod serves to maintain the bearing and journal member and wheels in proper position and serves to overcome the frictional drag of the wheels so that the spring 11 is relieved of twisting forces and the load on the trailer is dragged forward by the frame members of the trailer body.

If the bed of the trailer extends rearwardly of the caster wheels a substantial distance, then the pivot connection of the radius rods to the trailer body may be made rearwardly of the caster wheels, since the sole purpose of the radius rods is to maintain the caster wheel supports in proper relative position and prevent twisting of the journals supporting the caster wheels.

Figures 3, 4:
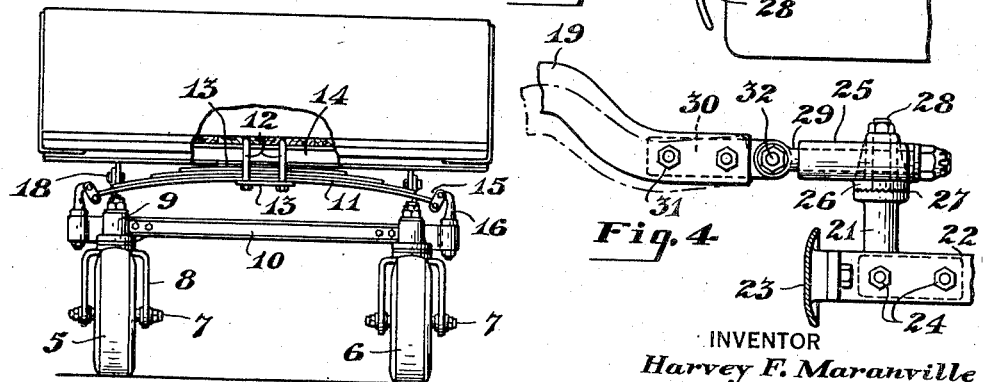
Fig. 3 is a rear elevation of the trailer shown in Figure 1.
Fig. 4 is a fragmentary detail showing the manner in which the trailer is connected to a towing vehicle.

In Figure 4 is illustrated the manner in which the forward end 19 of the framing members 1 and 2 may serve as draft arms or beams and be secured directly to a towing vehicle, such as the automobile, indicated generally by the numeral 20. The fitting or coupling unit comprises an upstanding bracket 21 secured to a bumper supporting bar 22 which carries a bumper 23 of the automobile 20 by means of nuts and bolts 24. Carried on the supporting surface of the bracket 21 is a fitting 25, which has a seat 26 arranged to rest upon the support of the bracket 21. The meeting surfaces of the support of the bracket 21 and the seat 26 of the fitting 25 are provided with matching corrugations 27. A bolt 28 carried by the bracket 21 and positioned in an aperture of the fitting 25 secures the bracket and fitting together and the corrugations 27 serve to retain the two parts in adjusted position. A draft bolt 29 is carried in an aperture in the fitting 25, positioned at right angles to the aperture which receives the holding bolt 28.

The forward ends 19 of the framing members 1 and 2 are provided with an element 30 secured by suitable bolts 31 and provided with an aperture which receives a bolt 32 carried in an eye in the end of the draft bolt 29. The bolt 32 provides a pivotal connection between the trailer and automobile 20, so that in going over an uneven road surface the trailer may move up and down with respect to the towing vehicle as indicated by the dotted lines of Fig. 4. The pivotal connection between the fitting 25 and bracket 21 provided by the bolt 28 and corrugations 27 is to permit proper alinement of the draft bolt 29 with respect to the forward end 19 of the framing members 1 and 2.

Figure 5:
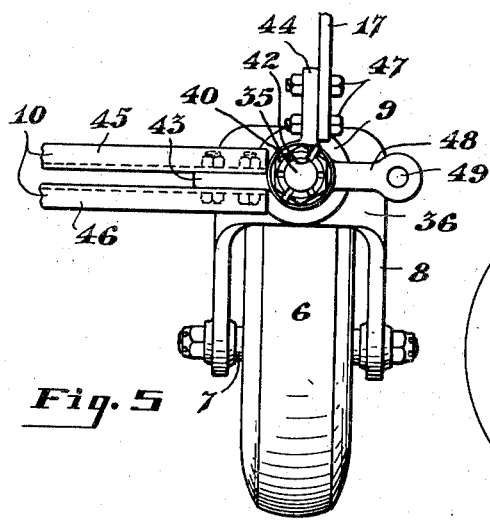
Fig. 5 is a fragmentary plan view showing the manner in which the caster wheel of the trailer illustrated in Fig. 1 is mounted.
Figure 6:
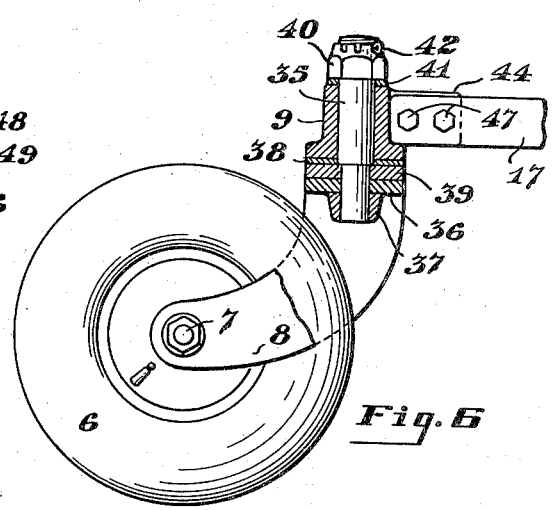
Fig. 6 is an elevational view partly in section of the caster wheel mounting shown in Fig. 5.

Referring t Figs. 5 and 6, the journal or supporting member 9 has an elongated vertical aperture or sleeve to receive the caster wheel spindle or pivot 35. This spindle is secured in an aperture in the top cross member 36 of the yoke 8 in any suitable manner such as brazing or welding, indicated at 37. Interposed between the journal member 9 and the top or cross member 36 is a friction washer 38 of brass or other suitable material, and a spacing member 39 which is of sufficient thickness to insure that upon swiveling of the caster wheel the top thereof will pass beneath the transverse supporting member 10. The top of the spindle 35 is provided with threads to receive a castellated hex bolt 40 which seats on a washer 41 and is prevented from rotation with respect to the spindle by means of a cotter pin 42.

Side portions of the journal member 9 are formed into extended lugs or ears 43 and 44. The ear 43 is directed toward the journal member 9 supporting the opposite wheel of the trailer and is arranged to fit between a pair of angle irons 45 and 46 which form the transverse supporting member 10. The angle irons 45 and 46 and the ear 43 are provided with alined holes which receive bolts for securing the transverse member 10 to the journal 9. The ear 44 is formed to extend from the journal at substantially a right angle to the transverse member 10 and is arranged to have the radius rod or stabilizing bar 17 rigidly secured thereto by means of a pair of nuts and bolts 47 received in alined holes.

On the opposite side of the journal 9 from the ear 43 is formed a bracket or support 48, the outer extremity of which is enlarged and provided with a vertical aperture 49 parallel with the spindle sleeve 35. The aperture 49 receives the shackle bracket 16 which may extend through the aperture 49 of the support bracket 48 and be secured by a nut.

Figure 2:
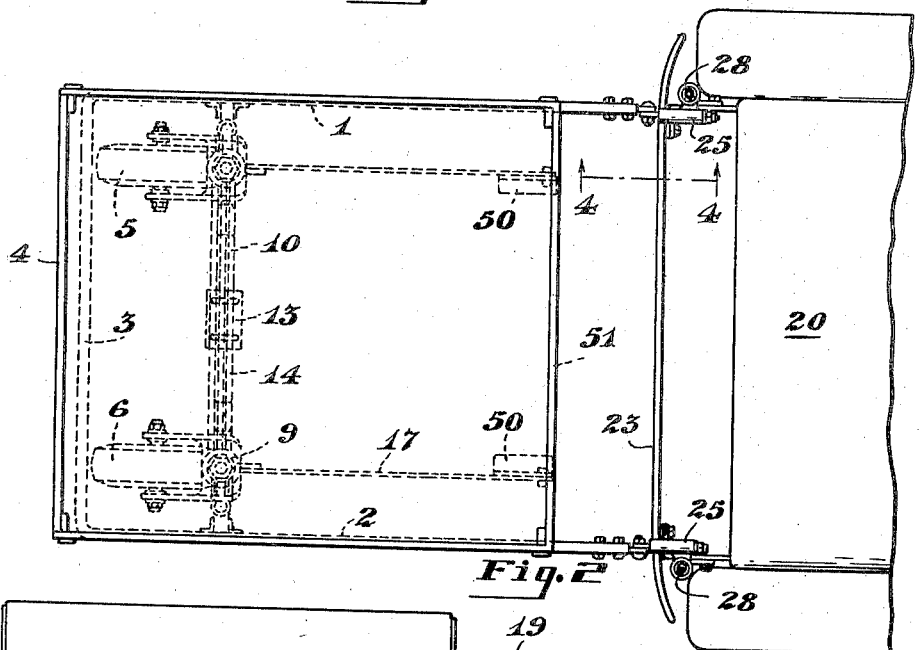
Fig. 2 is a plan view of the trailer illustrated in Figure 1.

The wheels 5 and 6 of the trailer may be positioned any suitable distance apart. In the event that they are closer together than the distance between framing members 1 and 2, as shown in Fig. 2, the pivots 18 are desirably carried on bracket members 50 which are suitably secured to a forward cross frame member 51. This framing member may be secured at its extremities to the side frame members 1 and 2 by any suitable means such as welding.

Figure 7:
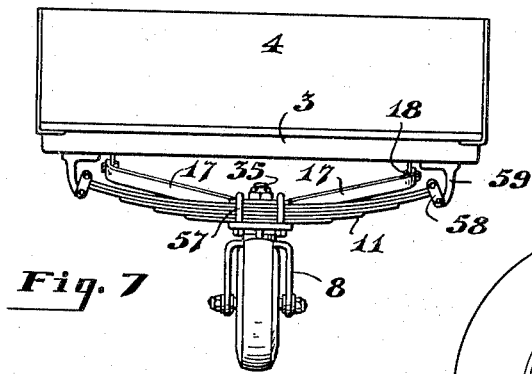
Fig. 7 is a rear view of a modified form of trailer embodying the present invention and using a single caster wheel.
Figure 9:
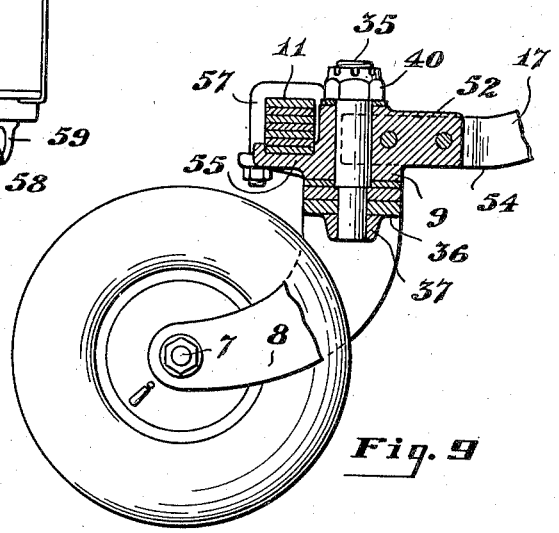
Fig. 9 is a fragmentary elevational view partly in section illustrating the caster wheel mounting shown in Figure 8.
Figure 8:
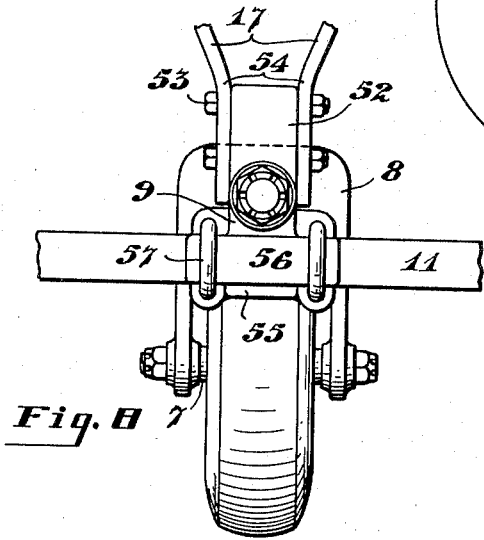
Fig. 8 is a fragmentary plan view showing the caster wheel mounting of the trailer illustrated in Fig. 7.
Figure 10:
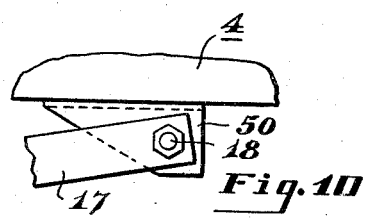
Fig. 10 is a fragmentary detail showing the manner in which radius rods or stabilizing bars are secured to the frame of the trailer.

In a caster wheel trailer of this character which is secured to the towing veicle at a pair of spaced points, such as the bracket 21, it is sometimes desirable to employ a single caster wheel for supporting the trailer. Such a construction is illustrated in Figs. 7, 8 and 9. The construction corresponds to that previously described, and accordingly, like parts have been indicated by the same numerals of reference. In a single wheel construction there will be no transverse supporting member 10 and accordingly the lugs or ears 43 and 44 previously described are replaced by a single forwardly extending lug 52. This lug is rigidly secured between the rearward ends of the radius rods or stabilizing bars 17 by means of nuts and bolts 53. Each of the radius rods 17 is bent at 54 adjacent the lug 52 so that the forward ends of the radius rods diverge from one another to provide additional stability to the journal member 9 and caster wheel.

A spring supporting bracket 55 is formed on the opposite side of the spindle-receiving sleeve of the journal 9. In the single wheel construction the transverse semielliptic spring 11 has its central portion seated on the spring bracket 55 and secured thereto by a spring seat 56 and a pair of U-bolts 57. The extremities of the spring carry spring shackles 58 which are pivoted in brackets 59 carried by the frame of the trailer. As shown in Fig. 7 the forward ends of the radius rods or stabilizing bars 17 are bent adjacent the brackets 50 an amount equal to the bend at 54 so that the forward extremities of the radius rods will be parallel with one another to permit vertical pivotal movement.

A trailer constructed according to the present invention has a number of advantages. A principal feature is that there is a minimum of unsprung weight. It is clear that the entire live load carried in the body 4 of the trailer will be sprung either by the transverse semielliptic spring 11 or by the springs of the towing vehicle to which the body load is directly connected. In addition, substantially the entire dead load which includes the structural elements of the trailer is carried on springs, the only unsprung weight being the actual running gear which includes the wheels themselves and their supporting structure. This design is accomplished without sacrificing rigidity and strength in the running gear. The relatively long radius rods or stabilizing bars 17 which are rigidly secured to the supporting member for the wheels retains the spindles 35 in substantially vertical position without interfering objectionably with the flexing of the transverse spring 11.

The feature of directly connecting the framing members of the trailer to the towing vehicle is of advantage in that there are no transverse stresses imparted by the load to the running gear and the wheels are free to respond readily to any change in direction of the towing vehicle, thus producing a true caster action. Forces caused by traveling over a rough or bumpy road or the centrifugal force developed in traversing a curve are transmitted directly to the towing vehicle by the side framing members 1 and 2 which are rigidly secured thereto by means of the brackets 21. This construction overcomes the objectionable feature of having the running gear connected to the towing vehicle which would result in having all of the strains caused by the load transmitted to the towing vehicle through the running gear.

The embodiments of the present invention illustrated in the drawings and described in the specification are given for purposes of illustration and description only and various modifications and alterations of construction and design in accordance with particular requirements are contemplated and intended to be secured by the appended claims.

What I claim is:

1. In a trailer construction a body, a frame for carrying the body, said frame extending forwardly of the body and having spaced elements for connecting the trailer frame directly to a towing vehicle, a caster wheel under the body, a journal member for the wheel, a semi-elliptic leaf spring secured to the frame and journal member and arranged to support the frame on the wheel, said spring extending transversely of the trailer substantially at a right angle with respect to the normal direction of trailer movement and having extremities carried in shackles disposed on both sides of the normal plane of rotation of the caster wheel to locate the wheel load between the spring shackles, and a pair of radius rods secured to the journal member and to spaced apart portions of the frame remote from the spring for stabilizing the wheel, said journal member, spring shackles, radius rods and wheels being the only non-spring supported trailer part and the unsprung parts being driven by the towing vehicle through the spring mounted frame.

2. In a trailer construction a body, a frame for carrying the body, said frame extending forwardly of the body and having spaced elements for connecting the trailer frame directly to a towing vehicle, a pair of caster wheels under the body, a journal member for carrying each wheel, a transverse supporting member extending between and secured to the journals, a semi-elliptic leaf spring disposed transversely of the trailer, said spring centrally secured to the frame and having extremities carried by shackles secured to the journal members beyond the normal plane of rotation of the wheels to locate the wheel load between the spring shackles, and radius rods secured to the journal members and to spaced apart portions of the frame remote from the spring for stabilizing the wheels, said journal members, supporting member, spring shackles, radius rods and wheels being the only non-spring supported trailer parts and the unsprung parts being driven by the towing vehicle through the spring mounted frame.

3. In a trailer construction, a body, a relatively rigid frame for carrying the body, said frame extending forwardly of the body and having spaced elements for connecting the trailer frame directly to a towing vehicle at spaced points, a running gear for supporting the frame and body comprising a spring holding member, a journal member rigid with the spring holding member, a caster wheel having a suitable connection with the journal member about a substantially vertical axis, a pair of radius rods rigidly connected to the journal member and pivotally connected to the frame at spaced apart points, a semi-elliptic leaf spring secured to the frame and spring support at laterally spaced points, said spring extending crossways of the trailer substantially at a right angle with respect to the normal direction of the trailer travel, said spring having its extremities carried by a pair of shackles, said shackles being disposed one on each side of the normal plane of said caster wheels to locate the wheel load between the ends of the spring, said radius rod pivots being at points removed from the spring, and the draft forces for moving the wheels being transmitted from the towing vehicle through the spring mounted body supporting frame and to the running gear solely through the radius rod pivots and leaf spring, whereby the radius rods, spring holding member, journal member and wheels are the only unsprung parts of the trailer.

4. In a trailer construction, a body, a relatively rigid frame for carrying the body, said frame extending forwardly of the body and having spaced elements for connecting the trailer frame directly to a towing vehicle at spaced points, a running gear for supporting the frame and body comprising a spring holding member, a journal member rigid with the spring holding member, a caster wheel having a suitable connection with the journal member about a substantially vertical axis, a pair of radius rods rigidly connected at spaced apart points to the journal member and pivotally connected at spaced apart points to the frame, said rods extending in generally parallel relation with one another, a semi-elliptic leaf spring secured to the frame and spring support at laterally spaced points, said spring extending cross-ways of the trailer substantially at a right angle with respect to the normal direction of the trailer travel, said spring having its extremities carried by a pair of shackles, said shackles being disposed one on each side of the normal plane of said caster wheels to locate the wheel load between the ends of the spring, said radius rod pivots being at points removed from the spring, and the draft forces for moving the wheels being transmitted from the towing vehicle through the spring mounted body supporting frame and to the running gear solely through the radius rod pivots and leaf spring, whereby the radius rods, spring holding member, journal member and wheels are the only unsprung parts of the trailer.

HARVEY F. MARANVILLE.